R. GARRISON & G. W. WHIPPLE.
CLAY MOLDING MACHINE.
APPLICATION FILED APR. 24, 1913.
1,147,627.
Patented July 20, 1915.
3 SHEETS—SHEET 1.
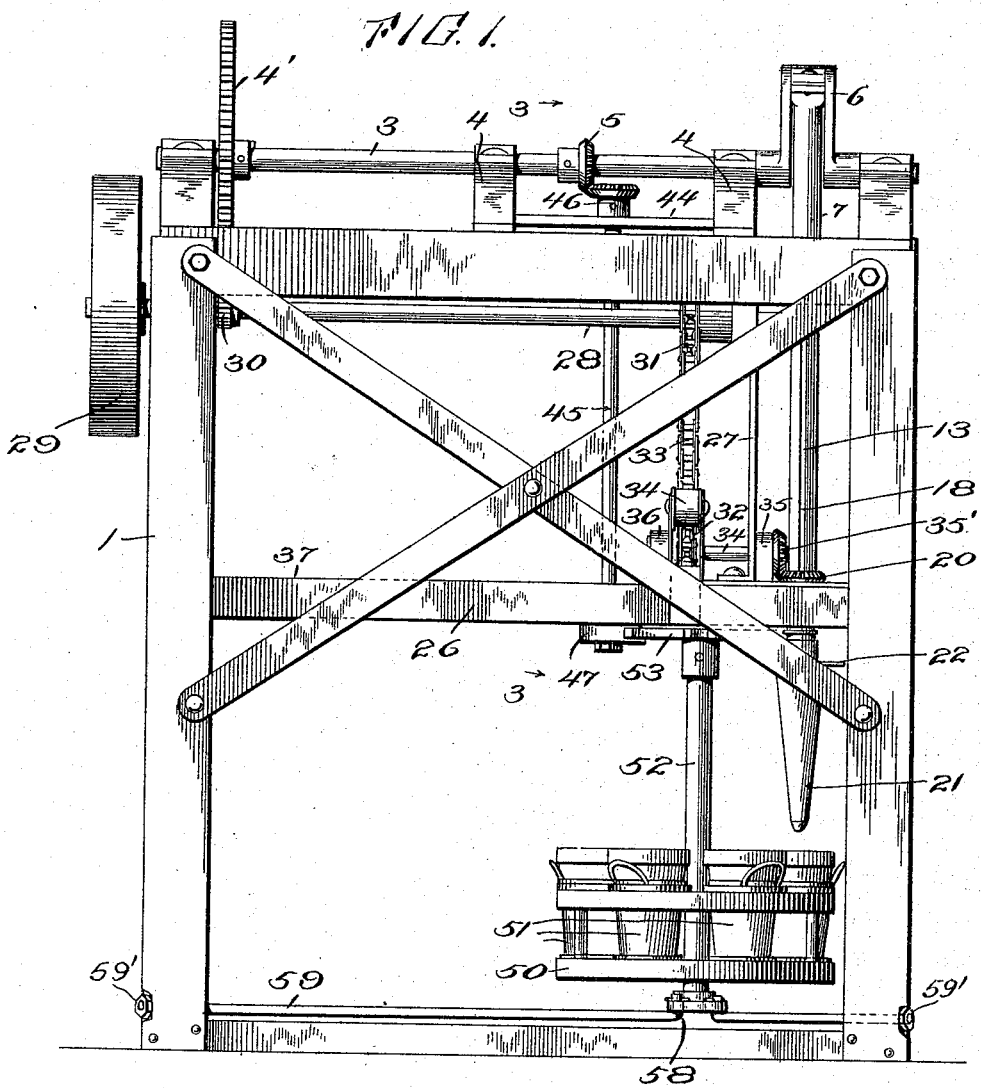

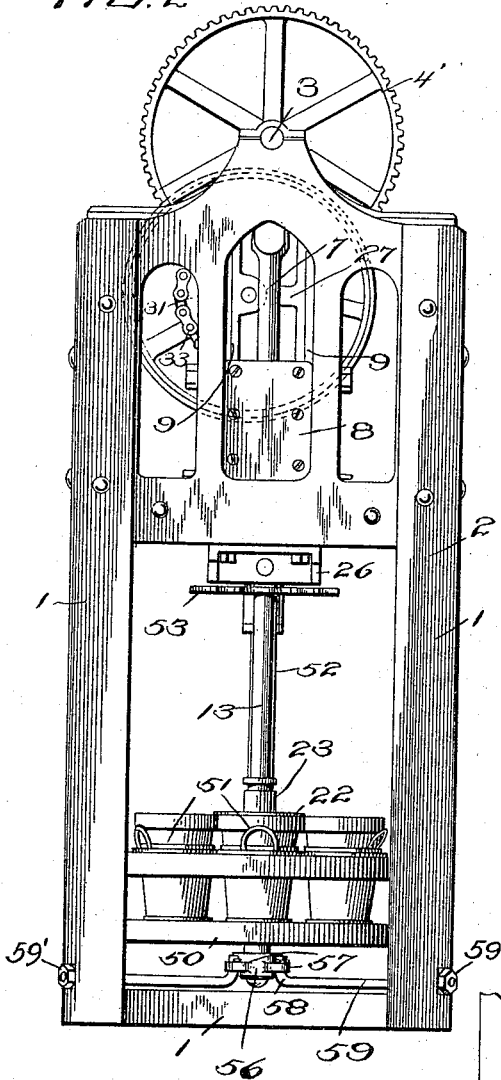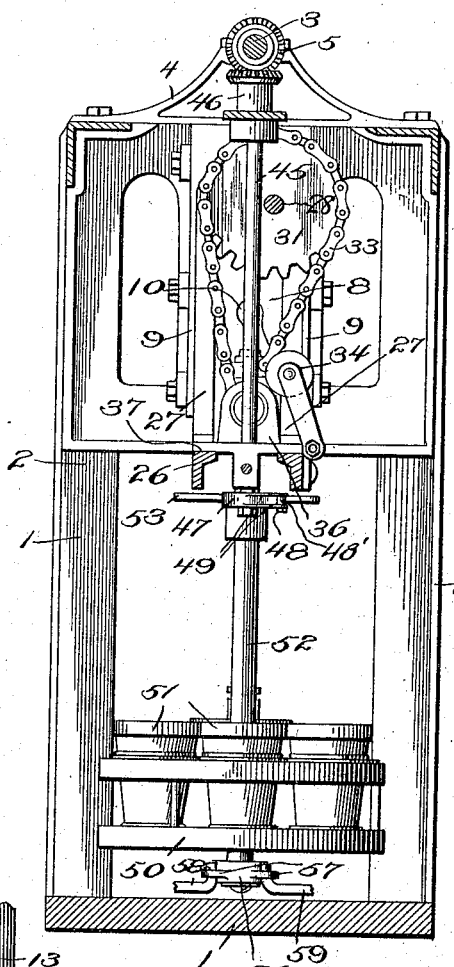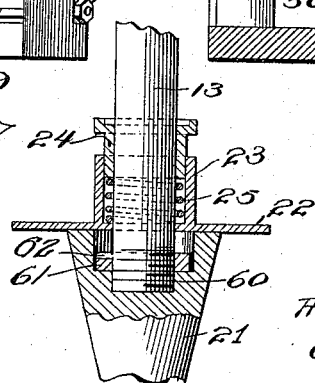

R. GARRISON & G. W. WHIPPLE.
CLAY MOLDING MACHINE.
APPLICATION FILED APR. 24, 1913.
1,147,627.
Patented July 20, 1915.
3 SHEETS—SHEET 3.
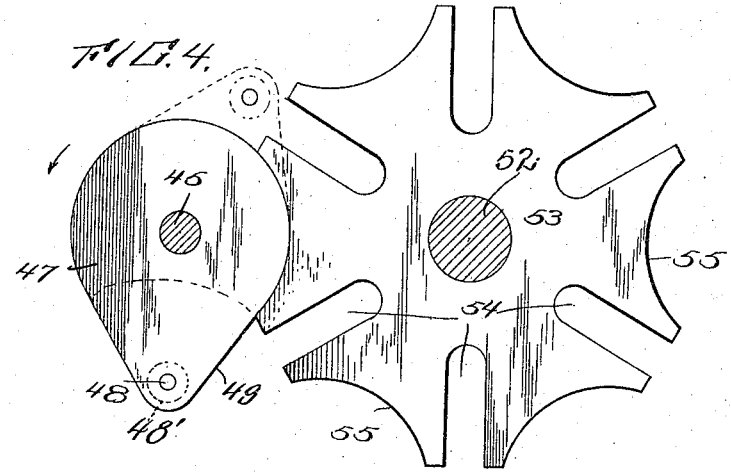
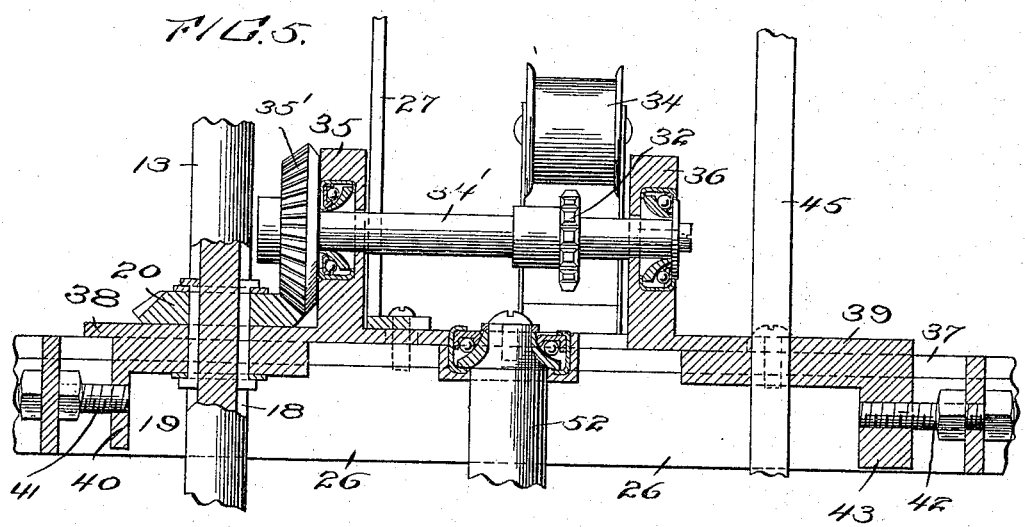
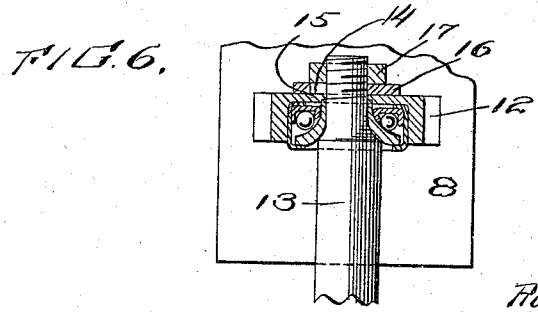
Witnesses
Inventor
Russell Garrison and
George W. Whipple;
By Mason Fenwick & Lawrence
Attorneys

UNITED STATES PATENT OFFICE.

RUSSELL GARRISON AND GEORGE W. WHIPPLE, OF CHERRYVALE, KANSAS.

CLAY-MOLDING MACHINE.

1,147,627.  Specification of Letters Patent.  Patented July 20, 1915.

Application filed April 24, 1913. Serial No. 763,422.

*To all whom it may concern:*

Be it known that we, RUSSELL GARRISON and GEORGE W. WHIPPLE, citizens of the United States, residing at Cherryvale, in the county of Montgomery and State of Kansas, have invented certain new and useful Improvements in Clay-Molding Machines; and we do hereby declare the following to be a full, clear, and exact description of the invention, such as will enable others skilled in the art to which it appertains to make and use the same.

This invention relates to improvements in machines for molding clay, particularly machines adapted to the manufacture of clay condensers such as are used in the smelting of zinc.

An object of the invention is to provide in connection with a table a plunger adjustable both laterally and vertically with respect to the table frame of the machine.

A further object of the invention is to provide an improved plunger for clay molding machines, this plunger having an improved cover slidably mounted upon the plunger and adapted to cover the molds, suitable concealed spring mechanisms being provided for allowing the cover to raise to eject surplus clay when the pressure on the clay in the molds exceeds a certain amount.

With these and other objects in view the invention comprises certain novel construction, combinations, and arrangements of parts as will be hereinafter more fully described and claimed.

In the drawings, Figure 1 is a front elevation of the machine with the plunger in raised position. Fig. 2 is an end view of the machine showing the plunger in its lowermost position. Fig. 3 is a vertical section taken on line 3—3 of Fig. 1 looking in the direction of the arrows. Fig. 4 is an enlarged detailed view looking down upon the locking mechanism. Fig. 5 is a partial vertical section taken on line 5—5 of Fig. 3. Fig. 6 is a vertical section taken through the plunger support showing means for adjusting the same. Fig. 7 is a vertical section taken through the top of the plunger showing the manner of mounting the cover for the mold.

Like reference characters designate corresponding parts throughout the drawings.

This invention aims to provide certain improvements over the form of clay molding machine disclosed in U. S. Patent #915,848, granted to us March 23, 1909. In the machine shown in that patent, the mold table is provided with a gear wheel adapted to be engaged by a continuously rotating segmental gear, this segmental gear being actuated by means of a horizontal shaft rotating in suitable journals formed in the top of the frame of the machine. A plunger adapted to rotate and reciprocate at the same time, is operatively connected to the driving shaft in the former patent, there being provided upon the plunger a cover controlled by adjustably mounted springs for the purpose of permitting surplus clay to be forced out of the same. The present invention aims to follow this same general scheme but provides certain improvements which materially modify the operation of the machine. These improvements are wrought by having an adjustably mounted plunger driven by an improved shaft and cross-head, the plunger being connected to a shaft adapted to be rotated and reciprocated at the same time. The mold table is rigid with a stationary shaft, the upper end of which is journaled in a support approximately mid-height of the machine frame, the lower end of which is suitably supported.

Referring to the drawings, where one specific form of the invention is shown, 1 designates a frame made of any suitable material, angle iron being shown for this purpose in the drawings. Each end of the frame is provided with a side plate 2, the upper ends of which are formed with journals for receiving the driven shaft 3, additional braces 4 being secured to the frame, to form additional journals for the shaft 3. Keyed to the shaft at one end thereof is a gear wheel 4', the purpose of which will be described presently, while intermediate the ends of the shaft 3 is a smaller beveled gear 5. The end of the shaft opposite the end carrying the gear wheel 4' is provided with a crank 6 operatively connected with a pitman 7, which is connected to a suitable cross-head 8. The cross-head 8 slides on ways 9, which are made of any suitable material, such as cast iron and are bolted to the side plates 2 of the frame. Extending from the upper portion of the cross-head 8 is a driving pin 10, adapted to engage the lower end of the pitman 7. A bearing 12 extends from the face of the cross-head, and has journaled therein a shaft 13 adapted to be reciprocated and rotated at the same time. The upper end of the shaft 13 passes through the bearing 12 and extends thereabove, there being provided in the upper end of the shaft 13 a pin 14 adapted to pass through a key way 15 formed in a collar 16. Mounted upon the top of the collar is a nut or other suitable adjusting means 17, this nut engaging the upper threaded end of the shaft 13. By means of the shaft thread and nut, the shaft may be adjusted to any desired position within certain limits in a vertical direction, the collar 16 and pin 14 serving to maintain the adjustment by relieving all wearing between the nut 17 and the bearing 12. By means of the crank 6 rotating with the shaft 3 and the cross-head 8, it will be apparent that the shaft 13 will be given a reciprocating motion during the operation of the machine. In order that the shaft 13 may be given a rotary motion when in any part of its travel, there are provided key ways 18 which are adapted to receive keys 19 carried by a beveled gear 20. From this construction, it will be evident that when the beveled gear 20 is continuously rotated, the shaft will be rotated therewith and the same given the necessary turning and reciprocating motions.

The plunger adapted to form the condensers is secured rigidly to the lower end of the shaft 13, said plunger constituting preferably a conical plunger proper 21 having slidably mounted thereon a cover 22. A collar 23 extending from the cover slides over a bushing 24 secured on the shaft 13, there being provided between the cover and bushing a helical spring 25 which normally presses the cover downwardly. The plunger is cupped in its upper end, and the bottom of the cup provided with a socket which is threaded as at 60 to receive the threaded end of the shaft 13, a locking nut 61 being provided to lock the plunger to the shaft. A pin 62 passes through the shaft and is received by a corresponding hole through the nut 61. The nut and the pin stand within the cup of the plunger, so that the cover 22 may be pressed down firmly onto the upper end of said plunger whatever the adjusted position of the latter upon the shaft.

Extending between the side plates 2 is a bracket 26 supporting a bearing frame 27, the upper end of which is secured to one of the intermediate braces 4. Between this bearing frame and one of the side plates 2 is a power shaft 28, the outer end of which has secured thereto a pulley 29 which may be driven by any source of power (not shown), a pinion 30 rigid with the shaft 28 and engaging the gear wheel 4' being provided as means for driving the shaft 3. Secured to the shaft 28 is a sprocket wheel 31 which is adapted to drive a sprocket gear 32 by means of a chain 33, an idler 34 being provided, if desired, for the purpose of adjusting the chain. The sprocket gear 32 is fast on a stub shaft 34', the shaft being journaled in suitable bushings 35 and 36 slidably mounted on the bracket 26 as hereinafter explained. One end of the shaft 34' carries a beveled gear 35' meshing with gear 20 adapted to rotate in a horizontal plane but restrained from moving in a vertical direction by means of any suitable bearing. Thus it will be seen, that as the power shaft rotates, the sprocket wheel 31 and the chain will serve to rotate the stub shaft and thereby drive the meshing beveled gears 20 and 35', the rotation of the stub shaft obviously being accompanied by the rotation of the plunger shaft 13.

The upper surface of the bracket 26 is provided with tracks 37 upon which ride plates 38 and 39. The plate 38 has depending therefrom a lug 40 having formed therein a threaded hole adapted to receive an adjusting screw 41 which is swiveled in one end of the bracket 26. By this means it will be seen that the plate 38 may be adjusted in a horizontal plane with respect to the bracket 26 and side plates 2. The beveled gear 20 is journaled in the plate 38, so that it will be readily seen that by adjusting said plate 38 with respect to the side plates 2, the gear 20 and consequently the shaft and plunger may be adjusted with respect to the cross-head 8. Inasmuch as the adjustment of the plunger is slight, no means is provided for adjusting the upper end of the shaft 13, although of course it is to be understood that should the adjusting of the beveled gear 20 be considerable, the upper end of the shaft 13 could be made adjustable. Secured also to the plate 38 and movable therewith is the bearing 35, in which is journaled one end of the stub shaft 34', so that the beveled gears 20 and 35' will always mesh, no matter what the adjusted position of the shaft 13.

The plate 39 which carries the bearing 36 supporting one end of the stub shaft 34' is slidable upon the tracks 37, the adjustment of said plate being obtained by means of an adjusting screw 42 swiveled in the bracket 26 and engaging a threaded opening in the lug 43 depending from the plate 39. By this means the plate 39 may be adjusted with respect to the side frames and bracket 26 and also with respect to the shaft 13 and the beveled gears 20 and 35'. In order to permit the adjustment of the plate 39 with respect to the plate 38, one end of the stub shaft 34' is provided with a slide bearing which will enable the said plates to be separated somewhat and still afford sufficient bearing for the stub shaft.

Extending between the braces 4 is a plate 44 in which is journaled a shaft 45, the upper end of which carries a beveled gear 46 adapted to engage the beveled gear 5 on the shaft 3. The lower end of the shaft 45 is journaled in the plate 39 and carries an oval shaped cam 47, forming part of a Geneva movement, and whose smaller end is provided with a pin 48. Preferably, that part of the cam 47 adjacent to pin 48 is cut away to provide parallel walls 49. The opposite end of the oval shaped cam 47 is arcuate, being struck preferably upon a circumference or a circle concentric with the axis of the shaft 45.

A mold table 50 is of the ordinary type, being provided with a plurality of molds 51 which may be of any design and forming no part of the present invention, these molds being placed in the path of the plunger as is well understood in the art. The mold table 50 is carried by a shaft 52, the upper end of which is journaled in the plate 38, the journal in the plate 38 being so constructed, if desired, as to support the entire weight of the table, although this is not essential to the present invention. The Geneva movement is employed to rotate and to lock the mold table 50 in any predetermined position. As seen, there is secured to the shaft 52 a disk 53 having therein slots 54, and being provided with arcuate portions 55 between the slots, these arcuate portions being struck preferably upon the circumference of a circle whose radius is equal to the radius of the arcuate portion of the cam 47. In normal locking position, the rotating arcuate portion of the cam 47 will engage the arcuate portions of the disk to hold the same against rotation. The lower end of the shaft 52 which carries the mold table 50 is journaled in a step bearing plate 56, having extending therefrom lugs 57 adapted to receive the upbent ends 58 of radiating brace rods 59. These ends 58 of the rods 59 are pivotally secured to the lugs in any manner, the outer ends of the rods being adjustably mounted in the frame as by nuts 59'. By reason of these rods 59, the position of the table with respect to the frame may be adjusted at will, and in any position they brace the step bearing against lateral movement when the plunger descends. These rods are to be made sufficiently strong under certain conditions to support the weight of the table, the bearing of the shaft 52 in the plate 38 in this case being simply a slight bearing and not provided with means for supporting the weight of the table.

During the operation of the machine, the shaft 28 constantly rotates at a uniform velocity, under which conditions the stub shaft 34' will be rotated uniformly, and therefore, the shaft 13 uniformly rotated. By reason of the pinion 30 and the gear wheel 4', the shaft 3 will also be rotated uniformly so that the plunger 21 will be reciprocated and rotated at the same time as previously explained. By means of the beveled gears 5 and 46, the shaft 45 is rotated uniformly so that the Geneva movement is actuated. As the cam 47 rotates, the pin 48, which may be provided with a roller 48' if desired, is designed to enter one of the slots 54, reference being had to Fig. 4, where it will be seen that a rotation of the cam 47 in the direction of the arrow will result in the turning of a disk and mold table. The disk will continue to rotate until the pin 48 leaves the slot 54, at which time the rounded portion of the cam 47 will engage the corresponding rounded portion of the disk, as indicated in dotted lines in Fig. 4, to prevent further rotation of the disk. During the time that the disk is locked, the plunger will descend to form the condenser contained in the molds 51, as is well understood in the art, and when the plunger is in a raised position clear of the molds, the pin 48 will enter one of the slots 54 and rotate the table 50.

The adjustment of the machine is made possible by the various adjusting devices described, the plunger 21 being first adjusted so as to move freely in the cross-head 8. This adjustment of the plunger can be obtained by means of the nut 41 engaging the lug 40, depending from the plate 38, the plate 38 being moved until the shaft 13 moves freely within its bearings. As before noted, insomuch as the bearing 35 moves with the plate 38, the beveled gears 20 and 35 will be constantly in mesh. Also, insomuch as the upper end of the shaft 52 which carries the mold table 50 moves with the plate 38, the relative position of the upper end of the shaft 52 and the gear 20 is not changed. After the plunger 21 has been adjusted, the position of the plate 50 may be adjusted so that the plunger will descend accurately into the molds 51. This adjustment of the table is made by means of the radiating brace rods 59, it being seen from the drawings that the table 50 is universally mounted and can be moved in any direction in a horizontal plane. After the plunger and table have been adjusted, the adjusting screw 42 may be moved to adjust the plate 39 and the cam 47 so that the pin 48 will register accurately with the slots 54 of the disk. In the form of the cam shown in the drawings, that portion of the disk extending between the arcuate and solid portions is designed to pass between the parallel walls 49 of the cam 47.

From the description of the drawings, it will be evident that all the operating parts of the machine are made adjustable, the method of adjustment being such that when taken in the proper order, none of the succeeding adjustments will alter one previously made. It will be further noted that the means for adjusting the mold table 50 may also be used for supporting the same.

What we claim is:

1. In a clay molding machine, the combination with a framework, a plunger movably mounted therein, and means to reciprocate the plunger vertically at intervals; of a table carrying a plurality of molds disposed in a ring and adapted to be brought successively under said plunger, a shaft through the center of the table, a bearing in which the lower end of the shaft is mounted, rods extending from said bearing to the corners of the frame, and means for adjusting them through the latter, for the purpose set forth.

2. In a clay molding machine, the combination with a framework, a plunger movably mounted therein, and means to reciprocate the plunger vertically at intervals; of a table carrying a plurality of molds disposed in a ring and adapted to be brought successively under said plunger, means for rotating said table intermittently, a shaft rising from the center of the table, a bearing carried by the framework and in which the upper end of said shaft is hung, a bearing in which the lower end of said shaft is mounted, and means for bracing this bearing laterally and adjusting it to accurately center the molds beneath the plunger.

3. In a clay molding machine, the combination with a framework, a plunger movably mounted therein, and means to reciprocate the plunger vertically at intervals; of a table carrying a plurality of molds disposed in a ring and adapted to be brought successively under said plunger, means for rotating said table intermittently, a shaft rising from the center of the table, a bearing carried by the framework and in which the upper end of said shaft is hung, a bearing in which the lower end of said shaft is mounted, rods extending from said lower bearing to the corners of the frame and through the latter, and adjusting nuts on the extremities of the rods, for the purpose set forth.

In testimony whereof we affix our signatures in presence of two witnesses.

RUSSELL GARRISON.
GEORGE W. WHIPPLE.

Witnesses:
ISABEL STAHL,
REGINA STAHL.

Copies of this patent may be obtained for five cents each, by addressing the "Commissioner of Patents, Washington, D. C."